United States Patent
Lanusse

[15] 3,658,432
[45] Apr. 25, 1972

[54] DEVICE FOR RATIONALLY APPLYING VARIOUS FLUID PRODUCTS

[72] Inventor: Marie Marguerite Lanusse, 50 rue Pierre Charron, 75 Paris 8, France

[22] Filed: Sept. 15, 1970

[21] Appl. No.: 72,481

[30] Foreign Application Priority Data

Jan. 23, 1970 France..................................7002508

[52] U.S. Cl...................................401/219, 15/24, 401/188
[51] Int. Cl. ........................................B44d 3/28, B44d 3/00
[58] Field of Search..................401/188, 219, 196, 197, 146; 15/501, 103, 97, 24, 29

[56] References Cited

UNITED STATES PATENTS

| 1,515,406 | 11/1924 | Peterson | 15/103 |
| 3,143,756 | 8/1964 | Sisko | 401/188 |
| 3,195,170 | 7/1965 | Howard | 401/188 |

Primary Examiner—Lawrence Charles
Attorney—Kenyon & Kenyon Reilly Carr & Chapin

[57] ABSTRACT

A spreader for applying make-up, paint or like fluid product is comprised of a detachable container for said product secured to a body including a source of electrical energy for feeding an electrical motor driving a pump, a handle carrying a control means for said motor, and a working head enclosing partially a freely rotatable roller provided with an absorbent lining which receives said product from an internally disposed sprinkling ramp fed by said pump.

8 Claims, 5 Drawing Figures

DEVICE FOR RATIONALLY APPLYING VARIOUS FLUID PRODUCTS

In various technical fields, it is usually required to spread products in a liquid or pasty stage onto various surfaces by means of pads, brushes, pencils or rollers which are in the most frequent occurrence saturated by dipping into a container enclosing the product to be spread.

Such a process has numerous drawbacks, since it requires handling of at least two different objects, and consequently implies difficulties as to its transport or storage. Besides, the thickness of the layer built up by the spread products is rarely uniform or regular, considering that it essentially depends upon the initial saturation of the spreader being used.

For palliating the above-mentioned drawbacks, it has been suggested to manufacture spreaders including dispositions for storing the product to be spread, which in such a case is usually delivered to the spreader or spreading member by the mere effect of gravity. Such apparatus are evidently subjected to the same working drawbacks, since it is quite impossible to precisely adjust the flow of product being delivered according to the course of its spreading.

The present invention aims to solve the above-mentioned problems by proposing a spreader of rugged design and practical handling, which could be used for spreading any kind of liquid or pasty products in any technical application to be envisaged, whilst always offering to the user the possibility of adjusting at will and instantaneously the rate of flow of the product being delivered.

According to this invention, a spreader for any liquid or pasty state product is comprised of the combination of a detachable container adapted to receive said products and of a working head removably mounted on said detachable container and including a partially open recess or chamber for receiving a freely rotatable roller and a closed internal cavity for receiving an electric motor driving a pump connected on the one hand to an inlet tube immersed in said container, and on the other hand, to an outlet duct leading to a sprinkling ramp, the outlets of which are located in front of the peripheral surface of the aforesaid roller located within said recess or chamber.

Further features of this invention will appear more clearly from the following description of a particular embodiment thereof, which is given by way of example only, and which is illustrated by the accompanying drawings, on which:

Figure 1:
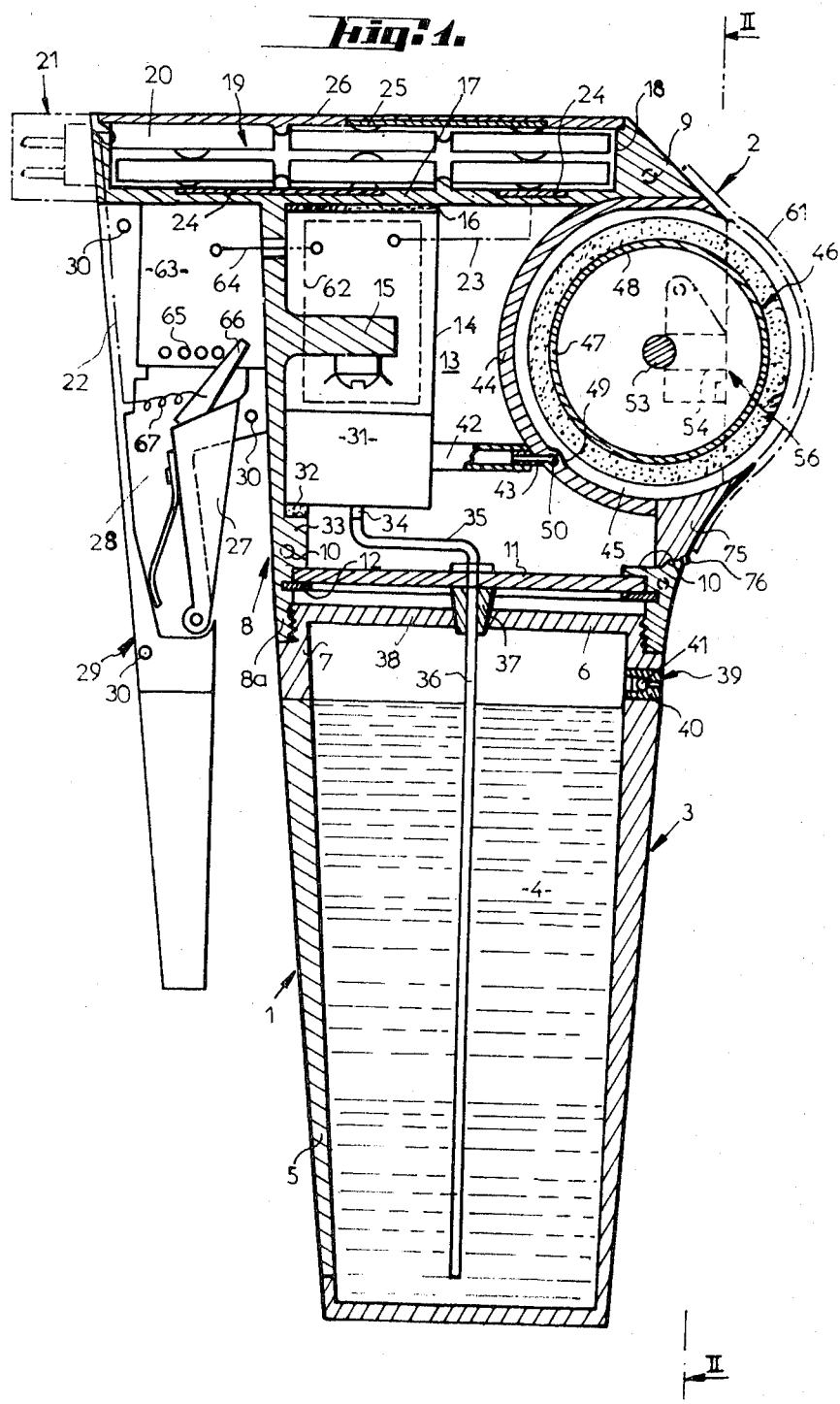
FIG. 1 is a sectional elevational view of a spreader according to this invention.
Figure 2:
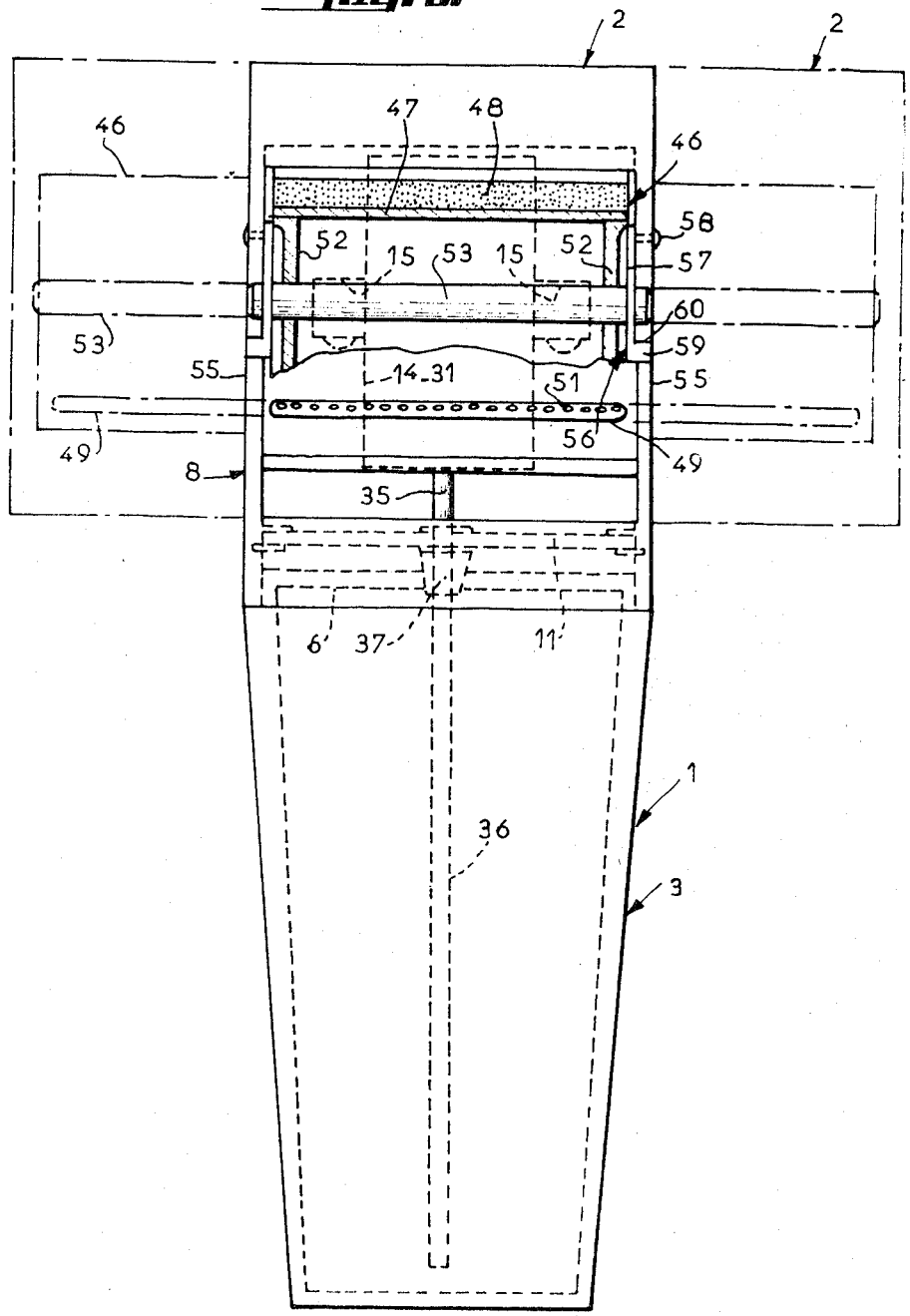
FIG. 2 is a transverse sectional view taken along line II—II of FIG. 1, with some parts broken out.

As shown in FIGS. 1 and 2, the spreader made in accordance with the present invention is essentially comprised of a moulded case 1 provided with a working head 2 and including a detachable container 3 for a quantity 4 of the liquid or pasty product to be spread. To this end, the detachable container 3, which can be made from any material complying with the requisite of product 4, is formed with a peripheral wall including a transparent window 5 through which the level of the enclosed product can be seen.

The aforesaid detachable container 3 is closed at its upper end by a wall 6 which is preferably constituted, although this is not shown, by a removable cover sealingly mounted onto a collar 7 adapted to receive the working head 2. Said working head consists of a body 8 moulded either integrally or in two parts, which are by way of example screwed together by means of screws extending through holes 9 (in dotted lines).

For enabling the mounting of body 8 on the detachable container 3, the collar 7 preferably includes an outwardly threaded portion engaging a corresponding inwardly threaded end section 8a of body 8.

The body 8 comprises behind its open section 8a a shoulder or heels 10 constituting a bearing surface for a removable wall 11 held in place by a resilient ring 12 or by any other means. The wall 11 is adapted to close a compartment 13 delimited by the walls of the body 8, in which is enclosed an electric motor 14 which is supported in a vertical position by internal projections 15 formed on the wall of body 8. By way of example, said projections 15 consist of integrally moulded prongs encompassing a passage, the cross-section of which corresponds substantially to that of electric motor 14, thereby enabling positive clamping of said motor, either directly or through the intermediary of distance pieces. The electric motor 14 is axially immobilized by means of a resiliently yieldable abutment pad 16 interposed between said motor 14 and the upper wall 17 of body 8. Said upper wall 17 further constitutes the bottom of a cavity 18 formed in the upper portion of body 8 and adapted to receive a source of electrical energy 19, such as a plurality of storage cells 20, which could be possibly re-energized periodically by means of a rectifyer (not shown) connected to a plug 21 (shown in phantom line) for connection of the spreader to the electrical mains through intermediary of a removable flex wire. Preferably the plug 21 is selectively connected to the mains of the storage cells 20 for charging purposes or of the electric motor 14 for its direct feeding through lines 22 and 23. The plurality of storage cells 20 is arranged within the cavity 18 for series connection of said cells; to this end, the wall 17 is provided with electrically conductive interconnection members 24 of a similar construction to the elongated metal plate 25 mounted on a removable lid 26 closing said cavity 18. Although this is not shown, the source of electrical energy 19 could consist as well of dry cells of any type hitherto known.

The feeding of electric motor 14 from either the source of electric energy 19 or possibly from the mains is controlled by a switch 27 which preferably includes an angularly movable key fitting partially within a recess 28 of a handle 29 made integral or associated with the body 8. Said handle 29 is advantageously made of two parts, one of which is removably mounted on body 8 to form a detachable cover offering free access to cavity 28. The connection between the aforesaid two parts of handle 29 can be embodied in various manners, and notably by means of screws extending through holes 30.

The electric motor 14 drives a pump 31 which lies through the intermediary of a resiliently yieldable abutment pad 32 onto an internal shoulder 33 of body 8. The damping pad 32 co-operates with the aforesaid pad 16 for dampening the axially directed vibrations of the electric motor 14 and of the pump 31 considered as a whole. The inlet port of said pump is provided with a tail pipe 34 which is connected by a flexible duct 35 to a plunger tube 36 extending through the wall 11, said tube 36 being provided with a resiliently deformable plug 37 co-operating with a complementary seat 38 formed by a hole extending through the centre portion of the wall 6. The length of said plug 37 is determined so that it is sufficiently deformed by the complementary seat 38 upon mounting of the body 8 on the detachable container 3, for instance by screwing, so that a sealing seat is obtained between the wall 6 of detachable container 3 and the plunger tube 36 extending into same. The length of the plunger tube 36 is slightly shorter than the height of the detachable container 3, and substantially corresponds to the lowest level of product which can be maintained and ascertained by looking through the window 5. The peripheral wall of the detachable container 3 is provided at a level higher than the level of maximal filling, with a vent 39 of any appropriate design, which is by way of example made of a sleeve containing a closure poppet 41 with possible spring bias, arranged for normally opposing any fluid outflow from the container 3 to the ambient air.

The outlet of the pump 31 is connected through the intermediary of a duct 42 to a tail pipe 43 carried by a part cylindrical wall 44 made integrally with the body 8 or mounted therein for closing the compartment 13 on its side opposite to the handle 29. Said part cylindrical wall 44 has an orientation such that its concavity faces outwards, and thereby delimits a chamber 45 adapted to receive and to retain a spreading member 46 consisting of a roller 47 provided with a lining 48 made of an absorbent flexible material, such as a cellular plastic material. The outer diameter of the roller 47 bearing its lining 48 is chosen for avoiding contact of its outer periphery with a sprinkling ramp 49 formed or carried by the part cylindrical wall 44 and in direct relation with its tail pipe 43. Preferably, the sprinkling ramp 49 is formed when the wall 44 is moulded, and comprises a naturally extending passage 50 connected on the one hand to the tail pipe 43 and on the other hand to a plurality of holes 51 directed towards the peripheral surface of the lining 48.

The roller 47 is rotatably supported by end plates 52 (FIG 2), which are possibly removable and through which extends a shaft 53, the end portions of which engage linear indentations 54 formed in the side walls 55 of the body 8. The closed terminal portions of said indentations 54 constitute bearings in which the end portions of shaft 53 are retained by lock members 56 carried by the body 8. Each of said lock members 56 could consist of a resilient clip made for example of spring wire, or of a stud carried by a resilient blade and arranged to fit in a blind hole formed axially in the corresponding end of the shaft 53. A preferred embodiment is shown on FIGS. 1 and 2, according to which each lock member 56 consists of a small plate 57 pivotally mounted on an axis 58 carried by the internal surface of the wall 55, said plate in its normal position closing the indentation 54 and thus maintaining the relevant end portion of the shaft 53. As further shown on FIGS. 1 and 2, said plates 57 are locked in their normal position by means of a lateral finger 59 adapted to fit in a complementary recess 60 cut in the edge portion of the lateral walls 55.

The spreader as shown and described works as follows :

Before operation, the user separates as by unscrewing the container 3 from the body 8, and introduces in said container the required quantity of the product 4 to be spread, which can be poured directly through the opening 38 or possibly after removal of the lid or end wall 6. The plunger tube 36 is then inserted through the opening 38, in which the plug 37 is sealingly fitted when the container 3 is screwed again onto the body 8. As shown on FIG. 1, the axial location of the plunger tube 36 provides for easy mounting and dismounting of the container 3 with respect to the body 8. The user then removes the protecting hood 61 which is adapted on the body 8 during rest periods for covering the portion of the roller 47 which projects outside of said body.

Then the spreader can be seized by means of its handle 29 to be brought towards the surface to be spread. The user may now actuate the key 27, thereby closing the feeding circuit of the electric motor 14 driving the pump 31. It is to be noted that the electric motor 14 can rotate for a relatively long time without any risk of excessive heating, considering that the lateral walls of the body 8 are each provided with at least one window 62 which allows for circulation of air and thereby for efficient cooling of the electric motor 14.

The pump 31 being driven in rotation causes the liquid product 4 to be drawn into the plunger tube 36, without creating thereby a vacuum inside of the container 3, since the vent 39 provides for constant equilibrium of the pressure within the container 3 and the ambient pressure. The liquid product 4 being thus drawn by the pump 31 is thereafter forced back through the duct 42 and the tail pipe 43 into the sprinkling ramp 49, from which it issues through the holes 51 to be projected directly onto the peripheral surface of the lining 48. The roller 47 being brought into contact with the surface to be spread is then alternatively driven into rotation in either direction by moving the spreader back and forth on said surface. Consequently, the liquid product 4 projected by the sprinkling ramp 49 onto any peripheral portion of the lining 48 of the roller is thereafter deposited onto the surface to be spread ; the particular configuration of the sprinkling ramp 49 as well as the distribution of its projecting holes 51 are of course determined to provide for a uniform spreading of the product to form a layer of constant thickness, which depends upon the speed of rotation of the roller 47.

Whenever required, the user may continue the back and forth motion of the spreader without actuating the key 27, whereby the supply of liquid products in the absorbent lining 48 of the roller 47 is at least partially exhausted.

In some cases, it could be advantageous to provide means for adjusting at will the rate of flow of the product delivered by the pump 31 in accordance with the viscosity of said product or for compliance with the requisite of the work to be done. Such adjusting means may consist of a device for modifying the speed of rotation of the pump 31, as shown on FIG. 1. On this Figure, the internal cavity 28 of the handle 29 is arranged to enclose an electrical apparatus 63 having a controllable resistance, such as a rheostat, which is electrically connected to the motor 14 by means of a lead 64. Said rheostat 63 includes a plurality of contact studs 65 co-operating selectively with a slider 66 carried by the key 27. Said slider 66 is electrically connected by a flexible lead 67 to the line 22, which can be advantageously embedded or mounted in the handle 29 for connection to the second terminal of the source of electrical energy 19.

When the spreader is working, the user holding same necessarily exerts on the key 27 a pressure which causes the slider 66 to be brought into engagement with the first contact stud 65. The connection thus established between the source 19 and the electrical motor 14 makes the latter drive the pump 31 into rotation. The arrangement of the electrical apparatus 63 is advantageously such that an increase in pressure on key 27 brings the slider 66 into engagement with the successive contact studs 65, whereby the voltage fed to the electrical motor 14 correspondingly increases, or conversely decreases, to promote proportional variations of the speed of rotation of said motor and, consequently, of the rate of flow of the product inpoured by the pump 31.

Figure 3:
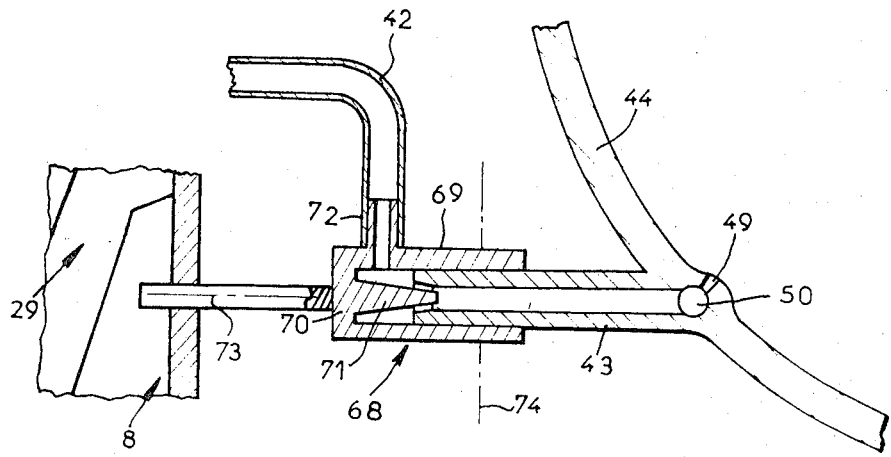
FIG. 3 is a sectional elevational view showing at a larger scale a modification of one of the constituting parts of the spreader.

FIG. 3 illustrates another possible embodiment of the invention, according to which the variations of the rate of flow of the product delivered by the pump 31 is conditioned by a regulator 68, consisting by way of example of a tubular ferrule 69 mounted with a slidable and sealing seat on the tail pipe 43. Said ferrule 69 includes a frusto-conical needle 71 extending axially from its blind ended bottom wall 70, said needle co-operating with a valve seat of corresponding configuration formed at the end of the tail pipe 43. The ferrule 69 besides includes a radially extending tubular port 72 to which is connected the duct 42 coming from the outlet of the pump 31. Lastly, the ferrule 69 is mechanically linked to a leverage, consisting by way of example of a tie-rod 73 rigid with its end wall 70 and extending slidingly outside of the body 8 into the vicinity of the handle 29. Thus, by actuating directly said tie-rod 73, the user can easily adjust the relative axial position of the ferrule 69 and consequently the depth of penetration of the needle 71 into the tail pipe 43 to correspondingly modify the flow area of the latter and accordingly the rate of flow of the liquid product delivered onto the peripheral surface of the roller 47.

In order to facilitate the operations of mounting or dismounting of the roller 47, for instance in view of cleaning the lining 48, the part cylindrical wall 44 or the sprinkling ramp 49, it could be advantageous to provide the body 8, as shown on FIG. 1, with a closure wall 75 pivotally supported by a horizontal hinge 76 and adapted to fit between the lateral wall 55 of the body 8, with the aid of resilient locking arrangements. In a such a structure, it would be profitable to confer to the rotatable closure 75 a thickness sufficient to provide for its abutment against the part cylindrical wall 45 in closed position, in order to prevent that a gap exists through which the liquid product 4 could flow into the compartment 13.

For certain applications, the spreader as hitherto disclosed might be provided with rollers 47 of different diameters. It would be then required to reduce to a minimum the gap existing between the edges of the curved wall 44 and the peripheral surface of the roller, by providing on the front wall of the body two slidable plates 77 and 78 which could be brought by manual displacement into any position lying between the end positions which are shown on FIG. 4 in full line and phantom line respectively.

Figure 4:
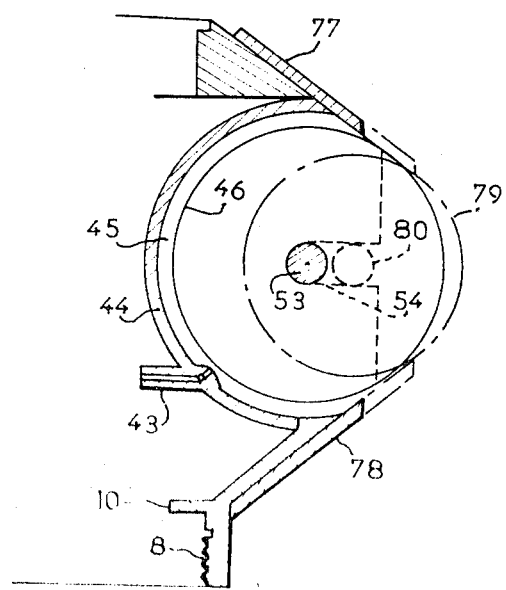
FIG. 4 is a sectional elevational view similar to FIG. 1, showing a further modification of some constituting elements of the spreader.
Figure 5:
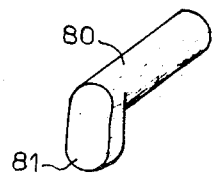
FIG. 5 is a perspective view showing separately the detailed configuration of one of the constituting elements of the spreader according to FIG. 4.

Said FIG. 4 shows further that the mounting of the roller of a small diameter, such as the roller shown in phantom line and bearing the reference number 79, could be effected without thereby having to substantially modify the working head 2. Indeed, it would suffice to provide the end portions of the roller shaft 80 with elongated members 81 having a width mating with that of the indentations 54, and a length such that the roller 79 projects outside from the body 8 in proportion to its diameter. Said elongated members 81 could be locked in position substantially in the same way as previously described in relation to the plates 57, or by means of resilient clips.

In the various embodiments of the spreader hitherto disclosed, said spreader includes a roller 47 which is relatively small in its longitudinal dimension, as required in numerous fields of use, such as the spreading of products of pharmaceutical, cleaning or housekeeping interest. This spreader however could be adapted for other uses than those heretofore mentioned, and notably for painting or maintaining very large surfaces; in such a case, it would be advantageous to conform the working head 2 as shown in phantom line on FIG. 2, in order that the roller 47 presents an axial length compatible with the importance of the surface to be painted or maintained. It is to be noted that the spreader according to this invention is constructed so that one and the same container 3 could be mounted on different working heads 2 having different characteristics of use, and possibly adapted for receiving rollers of various diameters. Although this is not shown, similar dispositions could be provided as to the container 3, in order to confer to the same a shape differing from that shown and described or a capacity corresponding to the rate of flow of the product being used and/or to the area of the surface to be spread.

Of course, the invention is not construed to be limited to the embodiments thereof as shown and described, which have been given by way of example only; on the contrary, numerous modifications and adaptations could be brought by those skilled in the art to the spreader as shown and disclosed, without thereby departing from the scope of the present invention, as defined in the appended claims.

What is claimed is:

1. A spreader for uniformly applying a fluid product onto a surface, comprised of a container adapted to receive a controllable quantity of said product and of a body to which said container is detachably secured, said body carrying an adaptable working head and being provided with means operative for feeding to said working head a rated flow of said product positively drawn from said container, characterized in that said working head consists of a roller provided with an absorbent lining, removably mounted for free rotation within a partially open recess formed in one side face of said body and delimited by a part-cylindrical bottom wall provided with an axially extending sprinkling ramp having a plurality of orifices directed towards said lining of said roller; said sprinkling ramp being connected to the outlet of a pump located within an internal cavity of said body and the inlet of which is connected to a plunger tube sealingly extending outside of said cavity into the bottom portion of said container; said pump being driven by an electric motor located within said cavity and fed by a source of electrical energy incorporated to said body through the intermediary of switch means operative to control the actuation of said motor, and thus to condition the flow of said product delivered by said pump to said sprinkling ramp; and said roller being driven into rotation in alternate directions by moving said spreader back and forth on said surface.

2. A spreader according to claim 1, wherein said container is removably secured to said body by attachment means in the form of a threaded connection or the like implying relative rotation of said container with respect to said body, and wherein said plunger tube extends axially of said container.

3. A spreader according to claim 2, wherein said container comprises an upper wall formed with a centrally located frusto-conical hole, and wherein said plunger tube is provided with a resiliently deformable plug of frusto-conical configuration mating with said hole for providing a sealing fit.

4. A spreader according to claim 1, wherein the lateral wall of said recess of said body are formed with blind-ended linear indentations extending substantially diametrically of said part-cylindrical wall towards the opening of said recess, said indentations constituting respective bearings providing for removable rotatable mounting of said roller.

5. A spreader according to claim 4, wherein said roller is provided with axial shaft members which are retained in said indentations by resilient locking means.

6. A spreader according to claim 5, wherein said shaft members carry elongated plates mating with said indentations and adapted to centre said roller with respect to said part-cylindrical wall.

7. A spreader according to claim 6, wherein said body is provided with flaps operative for adapting the opening of said recess to the size of the roller mounted therein.

8. A spreader according to claim 1, wherein the rate of flow of said product is controlled by varying the speed of said electrical motor means of associated switch means.

* * * * *